Patented Nov. 10, 1936

2,060,068

UNITED STATES PATENT OFFICE 2,060,068

MANUFACTURE OF CELLULOSE FROM LIGNOCELLULOSIC MATERIALS

Walter Henry Groombridge and Eric Vernon Mellers, Spondon, near Derby, England, assignors to Celanese Corporation of America, a corporation of Delaware No Drawing. Original application March 14, 1935, Serial No. 11,068. Divided and this application July 17, 1935, Serial No. 31,860. In Great Britain April 4, 1934

12 Claims. (Cl. 92—11)

This invention relates to the manufacture of cellulose from lignocellulosic materials such as wood and the like by processes in which lignin is removed from the materials in solution in organic solvents or solvent mixtures, and is a divisional of U. S. application S. No. 11,068 filed 14th March, 1935.

In processes of this kind it has been proposed to employ in association with the organic solvent or solvent mixture about 0.1% or less of its weight of an acid or basic substance, in order to assist in softening the lignocellulosic materials, and so to increase their susceptibility to attack by the organic extracting agent. The conditions of temperature and pressure needed to cause the organic solvent or solvent mixture to dissolve the lignin in a satisfactory manner are not perceptibly changed by this use of acid or basic substances.

According to the present invention lignin is removed from lignocellulosic materials in solution in organic solvents or solvent mixtures which contain sulphur dioxide. The use of sulphur dioxide in conjunction with the organic solvents or solvent mixtures enables the extraction to be carried out at lower temperatures than have hitherto been practicable; gives a product containing a higher percentage of α-cellulose; and makes it possible to isolate considerable quantities of sugars from the used liquor.

The sulphur dioxide is preferably employed in amount between about 2% and 8% or more, for example between 2 and 5%, of the solvent or solvent composition. Thus, for example, an alcohol-water mixture containing 2½ or 5% of sulphur dioxide may be employed. However, proportions down to about 0.5% or even lower proportions may also be employed with good results. If desired the sulphur dioxide may be employed in association with basic or alkaline substances, and especially with less than the equivalent proportion of basic or alkaline substance, so that the solvent or solvent mixture contains free sulphur dioxide.

The temperature at which the extraction is effected is preferably above 100° C., for instance, between 115° and 175° C., and especially between about 120° and 155° C., although higher temperatures may be employed if desired.

The extraction may be effected under the pressure generated by the extracting agents at the temperature employed or under a higher pressure; for example, pressures between 20 or 40 atmospheres and 100 atmospheres may be employed at a temperature of 120°–155° C. or at other suitable temperatures. Such excess pressures may be obtained by means of a compressed gas such as nitrogen having no substantial chemical effect on the extraction process.

Among the organic solvents and solvent mixtures that may be employed are alcohol-water, e. g. denatured alcohol-water, acetone-water, dioxane, dioxane-water, alcohol-water-benzene, and many other mixtures, especially mixtures containing liquids of different polarities, as described, for example, in U. S. application S. No. 713,309 filed 28th February 1934, and particularly such mixtures containing water, as described for example in U. S. application S. No. 2,862 filed 22nd January 1935, and/or an alcohol or other hydroxy compound.

To facilitate impregnation of the material by the solvent or solvent mixture, the former is preferably treated in a finely divided form. For example, wood may advantageously be used in the form of chips or the like. The lignocellulosic material may be simply agitated with the solvent or solvent mixture, or to aid the impregnation the digester or other vessel containing the material may be evacuated to any desired degree before introducing the solvent or solvent mixture. Other methods may be used to facilitate impregnation, for example, sudden release of pressure within the materials whereby the active surface of the materials is increased to a very large extent. As described in U. S. application S. No. 565,203 filed 25th September 1931, such a process may be carried out by causing sudden vaporization of a liquid within the materials. Any other method of securing an efficient contact between the material and the solvent or solvent mixture may be employed.

The treatment of the lignocellulosic material with the solvent or solvent mixture may be effected in a single stage or two- or multi-stage process and in a continuous or discontinuous manner. For example the extraction may be performed in digesters or vessels such as are commonly employed in pulping processes, for example in the sulphite process. In another method of carrying out the invention the material may be subjected to a continuous extraction with the solvent or solvent mixture, for example as described in U. S. application S. No. 727,608 filed 26th May, 1934. The solvent or solvent mixture may, after the treatment, be cooled or distilled to re-precipitate the lignin and other substances contained therein and returned to the process.

If desired, the extraction of the lignin from the lignocellulosic materials may follow a preliminary treatment of the materials with hot or boiling water or water under pressure or with alkaline or acid solutions, but such preliminary treatment may, in general, be omitted. Moreover, the lignocellulosic material may if desired be subjected to other treatments prior to extraction by the process of the present invention, for example to treatments to remove resins. Such a treatment may consist in a simple extraction of the resin with benzene or a benzene-alcohol mixture. However, the resins are usually quite readily extracted in the process of the present invention, and a separate extraction is generally unnecessary unless the lignin is required in a more or less purified form.

The cellulose produced by the process of the present invention may be employed, if desired after any other treatment, for any of the purposes for which cellulose is used, for example for the manufacture of cellulose esters or ethers, cellulose nitrate or cellulose xanthate, or for the manufacture of other cellulose derivatives, or for the manufacture of paper, especially the better classes of paper. In the case of the manufacture of cellulose acetate or other organic esters of cellulose it is advantageous to apply a pretreatment before carrying out the esterification process. Thus, the extracted cellulose may be subjected to treatment with lower fatty acids especially if a lower fatty acid has not already been employed in the extraction process. Again, a two-stage pretreatment may be applied such as that described in U. S. Patent No. 1,711,110 involving a preliminary treatment with hot dilute alkali or with cold, strong alkali followed by a treatment with an organic acid and particularly a lower fatty acid.

The following example illustrates the invention but does not in any way limit it:—

*Example*

Spruce chips are extracted at a temperature of 150° C. with a liquor containing equal parts by volume of ethyl alcohol and water and containing 2% of sulphur dioxide. The extraction is carried out in three stages, each lasting about 2 hours. Fresh solvent is employed for each stage and the total weight of solvent used in all three stages is about 6 times the weight of the chips.

The cellulose produced is washed with a similar, but sulphur dioxide-free, alcohol-water mixture and is subjected to a chlorine bleach. The organic solvent liquor after use is freed from solids by distillation, and may then, after adjustment of the sulphur dioxide content, be used again; the solid residue comprises mainly lignin (partly in a sulphur-containing form) and water soluble sugars.

The term "organic solvent" employed in the claims denotes single organic solvents as well as mixtures of organic solvents with each other and/or with water.

What we claim and desire to secure by Letters Patent is:—

1. Process for the manufacture of cellulose form lignocellulosic materials, which comprises extracting lignin from the materials by solution in organic solvents which contain sulphur dioxide.

2. Process for the manufacture of cellulose from lignocellulosic materials, which comprises extracting lignin from the materials by solution in organic solvents which contain up to 8% of sulphur dioxide.

3. Process for the manufacture of cellulose from lignocellulosic materials, which comprises extracting lignin from the materials by solution in organic solvents which contain between 0.5 and 5% of sulphur dioxide.

4. Process for the manufacture of cellulose from lignocellulosic materials, which comprises extracting lignin from the materials at a temperature between 115° and 175° C. by solution in organic solvents which contain up to 8% of sulphur dioxide.

5. Process for the manufacture of cellulose from lignocellulosic materials, which comprises extracting lignin from the materials at a temperature between 115° and 175° C. by solution in organic solvents which contain between 0.5 and 5% of sulphur dioxide.

6. Process for the manufacture of cellulose from lignocellulosic materials, which comprises extracting lignin from the materials at a temperature between 120° and 155° C. by solution in organic solvents which contain between 0.5 and 5% of sulphur dioxide.

7. Process for the manufacture of cellulose from lignocellulosic materials, which comprises extracting lignin from the materials under a pressure between 20 and 100 atmospheres by solution in organic solvents which contain up to 8% of sulphur dioxide.

8. Process for the manufacture of cellulose from lignocellulosic materials, which comprises extracting lignin from the materials at a temperature between 115° and 175° C. and under a pressure between 20 and 100 atmospheres by solution in organic solvents which contain between 0.5 and 5% of sulphur dioxide.

9. Process for the manufacture of cellulose from lignocellulosic materials, which comprises extracting lignin from the materials by solution in a mixture of ethyl alcohol and water containing up to 8% of sulphur dioxide.

10. Process for the manufacture of cellulose from lignocellulosic materials, which comprises extracting lignin from the materials at a temperature between 120° and 155° C. by solution in a mixture of ethyl alcohol and water containing between 0.5 and 5% of sulphur dioxide.

11. Process for the manufacture of cellulose from lignocellulosic materials, which comprises extracting lignin from the materials by solution in a homogeneous mixture of ethyl alcohol, benzene and water containing up to 8% of sulphur dioxide.

12. Process for the manufacture of cellulose from lignocellulosic materials, which comprises extracting lignin from the materials at a temperature between 120° and 155° C. by solution in a homogeneous mixture of ethyl alcohol, benzene and water containing between 0.5 and 5% of sulphur dioxide.

WALTER HENRY GROOMBRIDGE.
ERIC VERNON MELLERS.